United States Patent
Baldwin et al.

(10) Patent No.: US 10,225,219 B2
(45) Date of Patent: Mar. 5, 2019

(54) MESSAGE DELIVERY IN A MESSAGE SYSTEM

(71) Applicant: INTERNATIONAL BUSINESS MACHINES CORPORATION, Armonk, NY (US)

(72) Inventors: Timothy J. Baldwin, Hursley (GB); Andrew Johnson, Hursley (GB); Peter J. Johnson, Hursley (GB); Fenglian Xu, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 239 days.

(21) Appl. No.: 15/049,252

(22) Filed: Feb. 22, 2016

(65) Prior Publication Data
US 2017/0244657 A1   Aug. 24, 2017

(51) Int. Cl.
*H04L 12/58* (2006.01)
*H04L 29/08* (2006.01)

(52) U.S. Cl.
CPC .............. *H04L 51/12* (2013.01); *H04L 67/26* (2013.01); *H04L 67/2809* (2013.01)

(58) Field of Classification Search
None
See application file for complete search history.

(56) References Cited

U.S. PATENT DOCUMENTS 6,643,682 B1 * 11/2003 Todd ...................... G06F 9/542
                                                         707/999.01
7,941,488 B2    5/2011 Goodman et al.
(Continued)

FOREIGN PATENT DOCUMENTS

WO    WO 2015/027853 A1    3/2015
WO    WO 2015/130763 A1    9/2015

OTHER PUBLICATIONS

Dominguez et al., "An Extended Topic-Based Pub/Sub Broker for Cooperative Mobile Services", IEEE Computer Society, 27th International Conference on Advanced Information Networking and Applications Workshops, Mar. 2013 (pp. 1313-1318).

(Continued)

*Primary Examiner* — Philip J Chea
*Assistant Examiner* — Hassan A Khan
(74) *Attorney, Agent, or Firm* — Richard Wilhelm; Matthew M. Hulihan; Heslin Rothenberg Farley & Mesiti PC (57) ABSTRACT

Control of message delivery from publisher devices to a subscriber application of a messaging system is provided. The subscriber application has a subscription registered with a broker application of the messaging system and is only permitted to receive messages relating to a topic of the subscription from a predetermined set of one or more publisher devices. The method includes: altering a topic identifier of a message from a publisher device to a modified topic identifier, and altering a subscription identifier from a subscriber application to a modified subscription identifier; analyzing the modified topic identifier and the modified subscription identifier to determine if the message is to be communicated to the subscriber application, and if so, information is removed from the modified topic identifier to form a reverted topic identifier, and the message and reverted topic identifier are communicated to the subscriber application.

14 Claims, 4 Drawing Sheets

(56) References Cited

U.S. PATENT DOCUMENTS

| | | | |
|---|---|---|---|
| 8,566,402 B2 | 10/2013 | Cullen | |
| 8,738,704 B2 | 5/2014 | Stark et al. | |
| 8,938,502 B2 | 1/2015 | Kahan et al. | |
| 2004/0122906 A1* | 6/2004 | Goodman | G06Q 10/107 |
| | | | 709/206 |
| 2005/0246186 A1* | 11/2005 | Nikolov | G06Q 10/107 |
| | | | 709/206 |
| 2006/0047666 A1* | 3/2006 | Bedi | G06F 17/3089 |
| 2008/0189388 A1* | 8/2008 | Khare | G06F 17/30699 |
| | | | 709/217 |
| 2008/0256553 A1* | 10/2008 | Cullen | G06Q 30/02 |
| | | | 719/313 |
| 2009/0125489 A1* | 5/2009 | Barker | G06F 9/542 |
| 2009/0228563 A1* | 9/2009 | Jones | G06F 9/526 |
| | | | 709/206 |
| 2010/0205427 A1 | 8/2010 | Bauer et al. | |
| 2011/0125921 A1* | 5/2011 | Karenos | H04L 45/00 |
| | | | 709/240 |
| 2011/0307603 A1* | 12/2011 | Ishikawa | H04L 67/26 |
| | | | 709/224 |
| 2012/0059882 A1* | 3/2012 | Stark | H04L 12/66 |
| | | | 709/205 |
| 2012/0215872 A1* | 8/2012 | Beardsmore | H04L 51/14 |
| | | | 709/207 |
| 2013/0339448 A1* | 12/2013 | Kahan | H04L 12/1859 |
| | | | 709/204 |
| 2015/0006555 A1* | 1/2015 | Fang | H04L 51/14 |
| | | | 707/755 |
| 2015/0039715 A1* | 2/2015 | Bhogal | G06F 9/546 |
| | | | 709/213 |
| 2015/0081798 A1 | 3/2015 | Lee et al. | |
| 2015/0120852 A1* | 4/2015 | Bhat | H04L 51/26 |
| | | | 709/207 |

OTHER PUBLICATIONS

Arun, P.S., Google Cloud Messaging (GCM) Now Supports iOS for Push Notifications, TOOBLER Blog, Aug. 7, 2015 (4 pages).

"MQTT Essentials Part 5: MQTT Topics & Best Practices", http://www.hivemq.com/blog/mqtt-essentials-part-5-mqtt-topics-best-practics, Sep. 28, 2015 (7 pages).

* cited by examiner

MESSAGE DELIVERY IN A MESSAGE SYSTEM

BACKGROUND

The present invention relates to the field of message delivery in a message system, and more specifically, to controlling message delivery from publisher devices to a subscriber application.

Publish/subscribe is a messaging mechanism by which subscriber applications (hereinafter referred to as "subscribers") may receive information, in the form of messages, from publisher devices (hereinafter referred to as "publishers"). In this context, a message is a unit of data (such as one or more bits or a string of data). A typical publish/subscribe system has more than one publisher and more than one subscriber.

SUMMARY

According to one or more aspects, a computer-implemented method is provided for controlling message delivery from publisher devices to a subscriber application of a messaging system, the subscriber application having a subscription registered with a broker application of the messaging system and only being permitted to receive messages relating to a topic of the subscription from a predetermined set of one or more publisher devices. The method includes: altering a topic identifier of a message from a publisher device to a modified topic identifier comprising a description of the topic of the message, and a set of one or more publisher devices that the publisher device belongs to; altering a subscription identifier from a subscriber application to a modified subscription identifier comprising a description of the topic of the subscription, and a predetermined set of one or more publisher devices that a message is permitted to be received from; analyzing the modified topic identifier and the modified subscription identifier to determine if the message is to be communicated to the subscriber application, and if the message is to be communicated to the subscriber application, removing the description of the set of one or more publisher devices that the publisher device belongs to from the modified topic identifier to form a reverted topic identifier, communicating the message and reverted topic identifier to the subscriber application.

According to one or more other aspects, a computer program product is provided for controlling message delivery from publisher devices to a subscriber application of a messaging system, the subscriber application having a subscription registered with a broker application of the messaging system and only being permitted to receive messages relating to a topic of the subscription from a predetermined set of one or more publisher devices, wherein the computer program product comprises a computer readable storage medium having program instructions embodied therewith, the program instructions being executable by a processing unit to cause the processing unit to perform a method comprising: altering a subscription identifier from a subscriber application to a modified subscription identifier comprising a description of the topic of the subscription, and a predetermined set of one or more publisher devices that a message is permitted to be received from; analyzing the modified topic identifier and the modified subscription identifier to determining if the message is to be communicated to the subscriber application; and where the message is to be communicated to the subscriber application, removing the description of the set of one or more publisher devices that the publisher device belongs to from the modified topic identifier to form a reverted topic identifier, and communicating the message and reverted topic identifier to the subscriber application.

In one or more further aspects, a system is provided for controlling message delivery from publisher devices to a subscriber application of a messaging system, the subscriber application having a subscription registered with a broker application of the messaging system and only being permitted to receive messages relating to a topic of the subscription from a predetermined set of one or more publisher devices. The system includes a memory, and a processor communicatively coupled to the memory, wherein the system performs a method comprising: altering a subscription identifier from a subscriber application to a modified subscription identifier comprising a description of the topic of the description, and a predetermined set of one or more publisher devices that a message is permitted to be received from; analyzing the modified topic identifier and the modified subscription identifier to determine if the message is to be communicated to the subscriber application, and if the message is to be communicated to the subscriber application, removing the description of the set of one or more publisher devices that the publisher device bellows to from the modified topic identifier to form a reverted topic identifier, communicating the message and reverted topic identifier to the subscriber application.

BRIEF DESCRIPTION OF THE DRAWINGS

Several embodiments of the present invention are described below, by way of example only, with reference to the drawings, in which.

DETAILED DESCRIPTION

It should be understood that the figures are merely schematic and are not drawn to scale. It should also be understood that the same reference numerals used throughout different figures designate the same or similar parts.

Interactions between publishers and subscribers may be controlled by components of a general purpose messaging system, such as a queue manager or by a component known as a message broker (or broker application). A messaging system is a service to which applications may connect, and a queue is an ordered list of messages maintained by the messaging system. Applications may place a message on a queue or request a message from a queue. The distinction between a queue manager and a message broker/broker application is not relevant to the present subject matter and these terms may be used interchangeably within the following description.

Publishers (such as publisher devices) supply information about a subject, without needing to know anything about the applications that are interested in that information. Publishers generate this information in the form of messages, called publications, that they want to publish, and define the topic of these messages. Typically, the controlling component (e.g. broker application) receives messages from publishers and subscriptions identifying subscribers on one or more topics. It then routes the published messages to the subscribers that have a registered interest in the topic(s).

Subscribers create subscriptions that describe the topic that the subscriber is interested in. Thus, the subscription determines which publications are forwarded to the subscriber. Subscribers may make multiple subscriptions and may receive information from many different publishers.

For example, Message Queuing Telemetry Transport (MQTT) is a known message publish/subscribe system. MQTT employs topic strings to separate the space of messages (rather like directories and subdirectories in hierarchical file systems). Messages are published to topics, and subscribers subscribe to topics so they only receive messages they are interested in. By way of example, a message published to a topic string of: "mytopic1/sect1/part1/type3/data" would match a subscribe to: "mytopic1/sect1/part1/type3/data"

MQTT employs the concept of wild cards in topic strings for subscriptions, with "+" matching one level and a trailing "#" matching any number of levels below. Wild card # matches any number of topic levels, so the following subscriptions would match to the published topic string above (of: "mytopic1/sect1/part1/type3/data"):
"mytopic1/sect1/part1/type3/#"
"mytopic1/sect1/part1/#"
"mytopic1/sect1/#"
"mytopic1/#"
"mytopic1/+/part1/type3/data"
"mytopic1/sect1/+/type3/data"
"mytopic1/sect1/+/+/data"
"mytopic1/+/part1/+/data".

Conversely, the subscription "mytopic1/sect1/+/type2/data" would not match to the published topic string above (of: "mytopic1/sect1/part1/type3/data").

A drawback is that publication of a message may be a costly operation for the publisher and/or the broker. For example, if the publisher is a low-powered sensor which requires the use of a radio to publish a message, publication of a message will consume much-needed battery power. Also, if a message to be published is very large, a large amount of resources may be required to publish the message.

It is therefore desirable for a publisher to avoid unnecessary publication of messages, such as when there are no subscribers for the topic of the message for example. One possible approach to address this is for the publisher to transmit information about the message topic to the broker and ask whether there are any subscriptions matching the topic. However, this approach requires a request/response conversation between the publisher and broker. Also, if the publisher is publishing messages about many different topics, many conversations may be required.

Further, subscriber applications may only be authorized to receive published messages from certain publisher devices. For example, since publisher devices can be grouped into 'bunches' or 'sets', and a subscriber application can be authorized to subscribe to a particular set of publisher devices, the subscriber application will then only receive data from devices in that set of publisher devices. Publisher devices may however be members of (e.g. belong to, or be included in) more than one set. Republishing each message to every set a device is a member of is therefore sub-optimal in terms of resource usage or efficiency. Also, another approach may be to have multiple subscriptions, one for each device in a set. This, however, exhibits a similar problem in that each subscription by a subscriber application is then converted to multiple subscriptions, one for each device. The broker application then needs to handle all the different subscriptions and match each device message with a subscription, which is again sub-optimal in terms of resource usage or efficiency.

Detailed herein is a concept for enabling flexible subscriptions such that different subscriber applications can use different topic strings to subscribe to the messages from sets of devices. The concept may be employed in a messaging system comprising sets of publisher devices, a broker (e.g. broker application) and a subscriber application. It may be such that the subscriber application is only permitted to receive messages relating to a topic of the subscription from a predetermined set of publisher devices.

As disclosed herein, modified topic identifiers and modified subscriber identifiers may be generated, which may then be used (e.g. processed or analysed by a broker application) to control the delivery of published messages to the subscriber application(s). Prior to delivery to a subscriber application, the modified topic identifier may be reverted back to its original form. In this way, new capabilities may be added to existing messaging systems.

For instance, an embodiment may not involve changing a MQTT broker, but instead a proxy application may be inserted between (i) the broker and (ii) the publisher devices and subscriber applications. Such a proxy application may, for example, intercept messages from a publisher device and undertake modification of the topic identifiers before communicating the modified topic identifiers to the broker. Similarly, the proxy application may intercept subscriptions from a subscriber application and undertake modification of the subscription identifiers before communicating the modified subscription identifiers to the broker. The proxy application may also then intercept messages from the broker and revert the modified topic identifiers back to their original form before communicating the message to the intended/target subscriber application.

One or more embodiments may therefore employ MQTT matching and wildcards to efficiently subscribe to messages from different sets of devices and perform message authorization and filtering. Also, an existing MQTT broker, like Really Small Message Broker (RSMB), may inject and remove topic prefixes, but only for separate end points. The publisher can determine if there is any need to publish the message and thereby avoid publishing messages for which there is no subscription.

Figure 1:
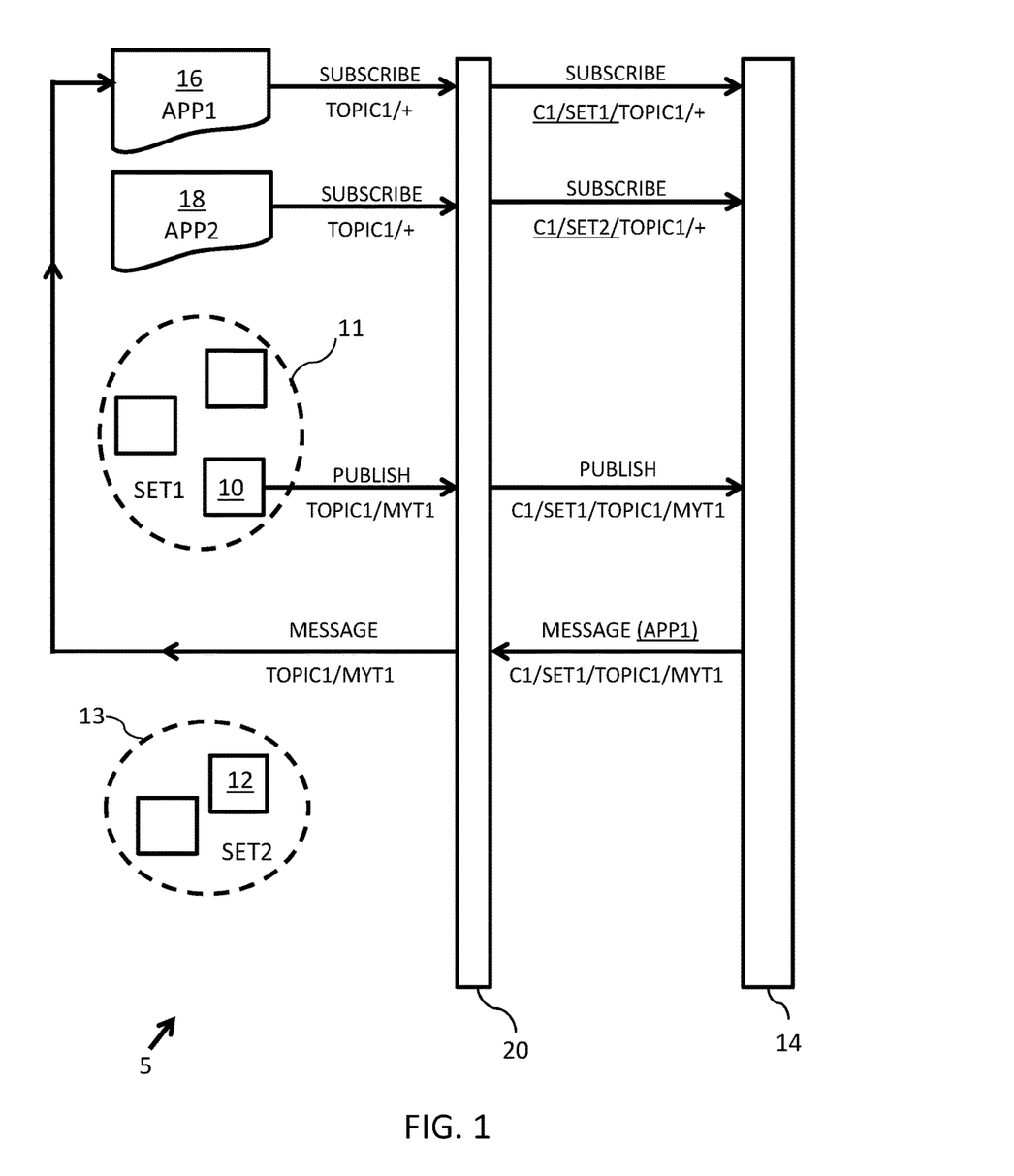
FIG. 1 is a block diagram of an example embodiment of a messaging system according to an embodiment wherein the example of a first publisher device of a first set of devices publishing a message is illustrated, in accordance with one or more aspects of the present invention.
Figure 2:
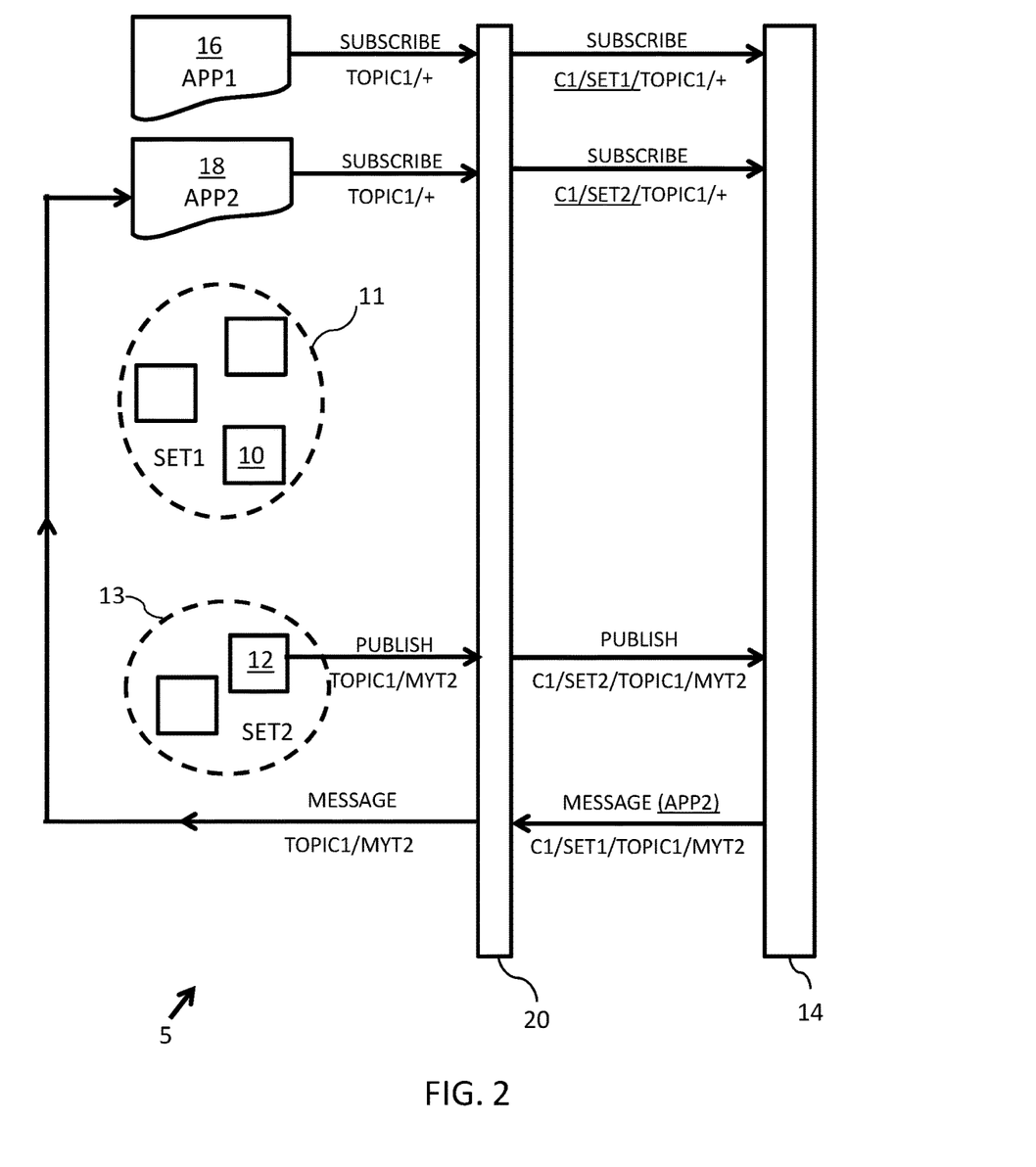
FIG. 2 illustrates a modification to the embodiment of FIG. 1, wherein the example of a second publisher device of a second set of devices publishing a message is illustrated, in accordance with one or more aspects of the present invention.

Referring to FIGS. 1 and 2, a messaging system is depicted according to a proposed embodiment of the present invention. The messaging system 5 comprises a first set 11 of publisher devices 10, a second set 13 of publisher devices 12, a message broker 14, first 16 and second 18 subscriber applications, and a proxy 20. Interactions such as communication of messages from the publisher device 10, 12 to the subscriber applications 16, 18 are controlled by the message broker 14, but are routed via (for example, through) the proxy 20.

The messaging system 5 is a service to which applications may connect and a queue is an ordered list of messages maintained by the messaging system 5. Applications may place a message on a queue or request a message from a queue. The distinction between a queue manager and a message broker is not relevant to the present subject matter and these terms may be used interchangeably within the following description.

Each publisher device 10,12 is adapted to supply information about a subject, without needing to know anything about the applications that are interested in that information. The publisher devices 10, 12 generate the information in the form of messages, or publications, and define the topic(s) of these messages in a topic identifier. The message broker 14 is adapted to receive messages from the publisher devices 10, 12 via the proxy 20, in addition to subscriptions from subscribers of one or more topics. The message broker 14 is adapted to route published messages to subscribers that have a registered interest in the topic(s) of the published messages.

The subscriber applications 16, 18 create subscriptions that describe the topic(s) that the subscriber is interested in. Thus, a subscription determines which publications are of interest to a subscriber application. The subscriber applications 16, 18 may make multiple subscriptions and may receive information from different publisher devices.

To receive publications, a subscriber application 16, 18 creates a subscription to selected publication topics. The subscriber applications 16, 18 generate the subscription information and define the topic of the subscription using a subscription identifier. The message broker 14 is adapted to receive subscription identifier from the subscriber applications 16, 18 via the proxy 20.

However, in this example, each subscriber application is only permitted (for example, authorized) to receive publications relating to a topic of the subscription from a predetermined set of publisher devices. For example, in the embodiment of the FIGS. 1-2, the first subscriber application 16 may only be authorized to receive publications from the first set 11 of publisher devices, and the second subscriber application 18 may only be authorized to receive publications from the second set 13 of publisher devices.

The message broker 14 is adapted to deliver publications to subscribers that have subscriptions which match the publication topic and authorized to receive the publications.

Thus, it will be appreciated that the proxy 20 of FIGS. 1-2 is inserted between (i) the broker 14 and (ii) the sets 11,13 of publisher devices and subscriber applications 16,18. The proxy 20 is adapted to intercept messages from the publisher devices and alter the topic identifiers of the messages before communicating the messages (along with their modified topic identifiers) to the broker 14. The proxy 20 is also adapted to intercept subscriptions from the subscriber applications 16, 18 and alter the subscription identifiers before communicating the subscriptions (and their modified subscription identifiers) to the broker 14. Also, the proxy 20 is adapted to intercept outgoing messages from the broker 14 and alter the modified topic identifiers back to their original form (for instance, remove the information that the proxy previously added into a topic identifier) before communicating the message, along with its reverted topic identifier, to the intended/target subscriber application.

A topic can be implemented as a text string describing an area of interest on which applications may wish to exchange messages (e.g., "topic1"). Subjects may be organized hierarchically, such as into a topic tree, using the forward slash ("/") character to create subtopics in the topic string (e.g., "topic1/myt1"). Topics are nodes in the topic tree that is the total space of all topics used within the messaging infrastructure. Topics may be leaf-nodes with no further subtopics, or intermediate nodes with subtopics. Topic strings that are created to represent subscriptions may contain wildcard schemes to pattern match against the topics of publications.

A subscription may be represented by a regular expression such as text string for example. Thus, more generally, a representation of a subscription may be represented using regular grammar. In the field of computer science, a regular grammar is a formal grammar that describes a regular language. Also, as has already been mentioned above in the description, a subscription description may employ wild cards in topic strings. For example, the character "+" may be used to matching one level, and the trailing character "#" may be used to match any number of levels below.

Subscriptions may be, by way of example, of two types: durable and non-durable. Non-durable subscriptions exist only as long as the subscribing application's connection to the broker 14 remains active. The subscription is removed when the subscribing application disconnects from the broker 14 deliberately or by loss of connection. Durable subscriptions continue to exist when a subscribing application's connection to the broker 14 is closed. If a subscription is durable, then when the subscribing application disconnects, the subscription remains in place and may be used by the subscribing application when it reconnects.

Thus, the messaging system 5 employs a selective publication concept, wherein the system is adapted to determine whether or not to communicate a publication (e.g. message) to a subscriber application. The messaging system 5 may, in some embodiments, push (that is, communicate without request) publications in response to registration of a new subscriber application for a specified topic. The system 5 may also push (that is, communicate without request) communications to the publisher devices in response to registration of a new subscriber application for a specified topic.

A subscriber application 16, 18 that is already connected to the system 5 may register a new subscription for a topic in which it is interested with the broker 14. Subscriber applications 16, 18 may do this on a durable basis (once registered, the subscription remains until explicitly deleted) or a non-durable basis (when the application disconnects, the subscription is removed).

Referring to FIG. 1 in particular, a first publisher device 10 may be a member of the first set 11 (or "SET1") of publisher devices, and a second publisher device 12 may be a member of the second set 13 (or "SET2") of the publisher devices.

First subscriber application 16 (or "APP1") is authorized to receive all messages from the first set 11 (i.e. SET1). In this example, it subscribes to all messages relating to "TOPIC1" using the subscription identifier "TOPIC1/+"

The proxy 20 receives (for example, intercepts) the subscription identifier from the first subscriber application 16 (that is, APP1) and alters the subscription identifier to create a modified subscription identifier comprising a description of: the topic of the subscription (for instance, "TOPIC1/+"); and the set (i.e., SET1) of publisher devices that the first subscriber application 16 is permitted to receive publications/messages from (e.g. "C1/SET1/"). As a result, the subscription identifier is modified from the original subscription identifier "TOPIC1/+" to create modified subscription identifier "C1/SET1/TOPIC1/+".

The proxy 20 then communicates the modified subscription identifier "C1/SET1/TOPIC1/+" to the broker 14.

Second subscriber application 18 (or "APP2") is authorized to receive all messages from the second set 13 (i.e.

SET2). In this example, it also subscribes to all messages on relating to "TOPIC1" using the subscription identifier "TOPIC1/+"

The proxy 20 receives (e.g. intercepts) the subscription identifier from the second subscriber application 18 (i.e. APP2) and alters the subscription identifier to create a modified subscription identifier comprising a description of the topic of the subscription (e.g. "TOPIC1/+"), and the set (i.e. SET2) of publisher devices that the second subscriber application 18 is permitted to receive publications/messages from (e.g. "C1/SET2/"). As a result, the subscription identifier is modified from the original subscription identifier "TOPIC1/+" to create modified subscription identifier "C1/SET2/TOPIC1/+".

The proxy 20 then communicates the modified subscription identifier "C1/SET2/TOPIC1/+" to the broker 14.

Subsequently, the first publisher device 10 publishes a message relating to "MYT1" which is sub-topic of "TOPIC1". Thus, in this example, the first publisher device 10 publishes a message with the topic identifier "TOPIC1/MYT1".

The proxy 20 receives (e.g. intercepts) the topic identifier from the first publisher device 10 and alters the topic identifier to create a modified topic identifier comprising a description of: the topic of the message (e.g. "TOPIC1/MYT1"); and the set (i.e. SET1) of publisher devices that the first publisher device 10 belongs to (e.g. "C1/SET1/"). As a result, the topic identifier is modified from the original topic identifier "TOPIC1/MYT1" to create modified topic identifier "C1/SET1/TOPIC1/MYT1".

The proxy 20 then communicates the modified topic identifier "C1/SET1/TOPIC1/MYT1" to the broker 14.

The broker 14 analyzes the modified topic identifier against the modified subscription identifiers it has received from the first 16 and second 18 subscriber applications (via the proxy 20) to determine if the published message is to be communicated to a subscriber application.

Here, in this example, the broker 14 matches the modified topic identifier "C1/SET1/TOPIC1/MYT1" to the modified subscription identifier "C1/SET1/TOPIC1/+" from the first subscriber application 16. Thus, the broker 14 determines that the message from the first publisher device 10 is to be communicated to the first subscriber application 16.

Accordingly, the broker 14 sends the message with the modified topic identifier "C1/SET1/TOPIC1/MYT1" to the first subscriber application 16 via the proxy 20.

The proxy 20 removes the description (i.e. "C1/SET1/") of the set of devices that the publisher device belongs to from the modified topic identifier, thereby forming a reverted topic identifier (which is identical to the original topic identifier "TOPIC1/MYT1" of the message published by the first publisher device 10).

The proxy 20 then communicates the published message with the reverted topic identifier to the first subscriber application 16.

By way of further example, and referring to FIG. 2, an example of the second publisher device subsequently publishing a message is described below. Here, the second publisher device 12 publishes a message relating to "MYT2", which is sub-topic of "TOPIC1" (but different from the sub-topic "MYT1"). Thus, in this example, the second publisher device 12 publishes a message with the topic identifier "TOPIC1/MYT2".

The proxy 20 receives (e.g. intercepts) the topic identifier from the second publisher device 12 and alters the topic identifier to create a modified topic identifier comprising a description of the topic of the message (e.g. "TOPIC1/MYT2"), and the set (i.e. SET2) of publisher devices that the second publisher device 12 belongs to (e.g. "C1/SET2/"). As a result, the topic identifier is modified from the original topic identifier "TOPIC1/MYT2" to create modified topic identifier "C1/SET2/TOPIC1/MYT2".

The proxy 20 then communicates the modified topic identifier "C1/SET2/TOPIC1/MYT2" to the broker 14.

The proxy 20 analyzes the modified topic identifier against the modified subscription identifiers it has received from the first 16 and second 18 subscriber applications to determine if the published message is to be communicated to a subscriber application.

Thus, in this example, the broker 14 matches the modified topic identifier "C1/SET2/TOPIC1/MYT2" to the modified subscription identifier "C1/SET2/TOPIC1/+" from the second subscriber application 18. The broker 14 therefore determines that the message from the second publisher device 12 is to be communicated to the second subscriber application 18.

Accordingly, the broker 14 sends the message with the modified topic identifier "C1/SET2/TOPIC1/MYT2" to the second subscriber application 18 via the proxy 20.

The proxy 20 removes the description (i.e. "C1/SET2/") of the set of devices that the publisher device belongs to from the modified topic identifier, thereby forming a reverted topic identifier (which is identical to the original topic identifier "TOPIC1/MYT2" of the message published by the second publisher device 12).

The proxy 20 then communicates the published message with the reverted topic identifier to the second subscriber application 18.

In view of the above-described examples of FIGS. 1-2, one may now consider an example wherein messages are published by cars of different types. In such an example, an administrator may have decided the group the cars into the follow twelve sets: Model1; Model2; diesel; petrol; GB; France; Germany; USA; Canada; Europe; North America; and satellite_radio. Subscriber application may then be authorized to receive published messages from just any one of these twelve sets.

By inspection, there are the following exclusive groups:
Model: Model1; Model2;
Engine: diesel; petrol (gasoline);
Country: GB; France; Germany; USA; Canada;
Continent: Europe; NorthAmerica;
Satellite radio: satellite_radio.

Any combination may be possible, but in this example it is considered that: there are no diesel cars in USA; there are no Model2 in USA or Canada; and that satellite radio is only in USA.

One may then identify the sets using a conventional graph coloring algorithm, wherein nodes are sets, and wherein links occur if any device is a member of the two sets concerned. Slots may then be identified in the subscription string according to the colors, wherein one slot is for each color.

For example, graph coloring could give the following groups:
Slot 1—Model1, Model2
Slot 2—diesel, petrol
Slot 3—Europe, NorthAmerica
Slot 4—GB, France, Germany, USA, Canada
Slot 5—satellite_radio, none.

Alternatively, graph coloring could give the following groups:
Slot 1—Model1, Model2
Slot 2—petrol, none Slot 3—Europe, NorthAmerica
Slot 4—GB, France, Germany, USA, Canada
Slot 5—satellite_radio, diesel, none.

By way of example, one may then consider vehicles having the following Vehicle Identification Numbers (VINs) with associated properties and set identifiers:

WVWZZZ1JZWB040695—Model1, Europe, GB, petrol—Prefix: conv5/model1/petrol/Europe/GB/none
WVWZZZ6NZXW064342—Model2, Europe, GB, diesel—Prefix: conv5/model2/none/Europe/GB/diesel
WVWAB7AJ9CW201735—Model1, North America, USA, petrol—Prefix: conv5/model1/petrol/NorthAmerica/USA/none
WVWDB7AJ5EW008921—Model1, North America, USA, petrol, sat radio—Prefix: conv5/model1/petrol/NorthAmerica/USA/sat
WVWZZZ1KZCW261460—Model1, Europe, GB, diesel—Prefix: conv5/model1/none/Europe/GB/diesel With the original topic string format being as follows: "iot-2/type/<type>/id/<myThingId>/evt/<myEvent>/fmt/json", the following example transformations of message topic identifiers from the publisher devices (undertaken by the proxy for example) may be obtained:

```
iot-2/type/car/id/WVWZZZ1JZWB040695/evt/engine_info/fmt/json
-->
conv5/model1/petrol/Europe/GB/none/iot-2/type/car/id/WVWZZZ1JZWB040695/evt/engine_info/fmt/json
iot-2/type/car/id/WVWZZZ1JZWB040695/evt/location/fmt/json
-->
conv5/model1/petrol/Europe/GB/none/iot-2/type/car/id/WVWZZZ1JZWB040695/evt/location/fmt/json
iot-2/type/car/id/WVWDB7AJ5EW008921/evt/engine_info/fmt/json
-->
conv5/model1/petrol/NorthAmerica/USA/sat/iot-2/type/car/id/WVWDB7AJ5EW008921/evt/engine_info/fmt/json
iot-2/type/car/id/WVWZZZ1KZCW261460/evt/engine_info/fmt/json
-->
conv5/model1/none/Europe/GB/diesel/iot-2/type/car/id/WVWZZZ1KZCW261460/evt/engine_info/fmt/json
iot-2/type/car/id/WVWZZZ6NZXW064342/evt/engine_info/fmt/json
-->
conv5/model2/none/Europe/GB/diesel/iot-2/type/car/id/WVWZZZ6NZXW064342/evt/engine_info/fmt/json
iot-2/type/car/id/WVWAB7AJ9CW201735/evt/engine_info/fmt/json
-->
conv5/model1/petrol/NorthAmerica/USA/none/iot-2/type/car/id/WVWAB7AJ9CW201735/evt/engine_info/fmt/json
```

Subscriptions of a subscriber application authorized to the set of 'petrol' vehicles for engine_info may then be transformed by the proxy as follows:

```
iot-2/type/car/id/+/engine_info/fmt/json
-->
conv5/+/petrol/+/+/+/iot-2/type/car/id/+/evt/engine_info/fmt/json
```

As a result, messages received from the broker via the proxy are transformed (e.g. reverted) by the proxy before they are forwarded to the subscriber application as follows:

```
conv5/model1/petrol/Europe/GB/none/iot-2/type/car/id/WVWZZZ1JZWB040695/evt/engine_info/fmt/json
-->
iot-2/type/car/id/WVWZZZ1JZWB040695/evt/engine_info/fmt/json
conv5/model1/petrol/NorthAmerica/USA/sat/iot-2/type/car/id/WVWDB7AJ5EW008921/evt/engine_info/fmt/json
-->
iot-2/type/car/id/WVWDB7AJ5EW008921/evt/engine_info/fmt/json
conv5/model1/petrol/NorthAmerica/USA/none/iot-2/type/car/id/WVWAB7AJ9CW201735/evt/engine_info/fmt/json
-->
iot-2/type/car/id/WVWAB7AJ9CW201735/evt/engine_info/fmt/json
```

Also, subscriptions of a subscriber application authorized to the set of 'GB' vehicles for all information may be transformed by the proxy as follows:

```
iot-2/type/car/id/+/+/fmt/json
-->
conv5/+/+/+/GB/+/iot-2/type/car/id/+/evt/engine_info/fmt/json
```

As a result, messages received from the broker via the proxy are transformed (e.g. reverted) by the proxy before they are forwarded to the subscriber application as follows:

```
conv5/model1/petrol/Europe/GB/none/iot-2/type/car/id/WVWZZZ1JZWB040695/evt/engine_info/fmt/json
-->
iot-2/type/car/id/WVWZZZ1JZWB040695/evt/engine_info/fmt/json
conv5/model1/petrol/Europe/GB/none/iot-2/type/car/id/WVWZZZ1JZWB040695/evt/location/fmt/json
-->
iot-2/type/car/id/WVWZZZ1JZWB040695/evt/location/fmt/json
conv5/model1/none/Europe/GB/diesel/iot-2/type/car/id/WVWZZZ1KZCW261460/evt/engine_info/fmt/json
-->
iot-2/type/car/id/WVWZZZ1KZCW261460/evt/engine_info/fmt/json
conv5/model2/none/Europe/GB/diesel/iot-2/type/car/id/WVWZZZ6NZXW064342/evt/engine_info/fmt/json
-->
iot-2/type/car/id/WVWZZZ6NZXW064342/evt/engine_info/fmt/json
```

It is to be understood that there could be variations where the topic components are injected in different places.

Figure 3:
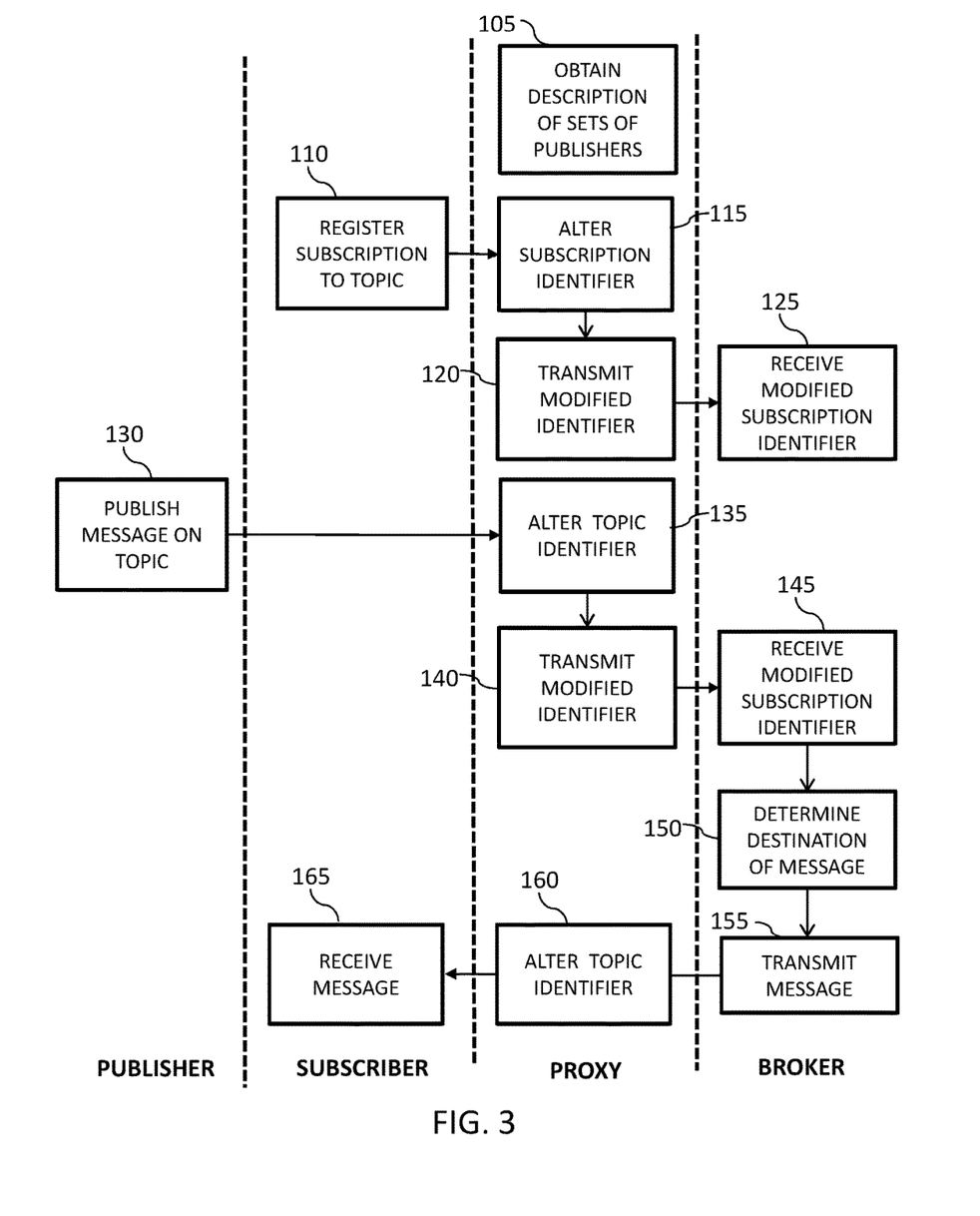
FIG. 3 is a flow chart of a method, in accordance with one or more aspects of the present invention.

An embodiment of a method of controlling 100 message delivery from publisher devices to a subscriber application of a messaging system may be readily understood with reference to FIG. 3. FIG. 3 is a flow chart of an exemplary implementation of a method according to an embodiment, wherein the steps of the method carried out by a messaging system, such as the system in FIGS. 1-2, according to a proposed embodiment of the present invention are depicted. In this regard, it is noted that the subscriber may only be permitted to receive messages relating to a topic of subscription from a predetermined set of publisher devices.

First, in step 105, the broker obtains a data structure describing a plurality of different sets of publisher devices and/or the devices or sets that subscriber applications are permitted/authorized to receive messages from. By way of example, the data structure may be provided to the broker from an external device and/or a user. Alternatively, and/or additionally, the broker may generate (at least portions of) the data structure. The data structure may comprise a list, table, tree or other suitable representation of sets of publisher devices and/or permissions. These sets may be predefined, e.g. via an external entity or user, or they may be determined by the broker. By way of example, using the data structure, the broker may identify a set of publisher devices that the publisher device belongs to, and/or identify a set of publisher devices that a subscriber application is permitted to receive a message from.

Next, in step 110, the subscriber application registers a subscription to a topic by generating and communicating a subscription identifier intended for the broker. By way of example, the subscription identifier comprises a string representing the subscription topic.

The proxy then intercepts the communicated subscription identifier and alters it in step 115. In this example, the proxy receives the subscription identifier from the subscriber and alters the subscription identifier to create a modified subscription identifier comprising a description of the topic of the subscription, and the set of publisher devices that the subscriber application is permitted to receive publication/messages from. As a result, the proxy generates a modified subscription identifier.

The modified subscription identifier is then transmitted from the proxy to the broker in step 120, and the broker subsequently receives and stores the modified subscription identifier in step 135.

When a new message is to be published to a topic by a publisher device, the method proceeds to step 130, wherein the publisher generates and communicates a message relating to the topic. The message includes (or is associated with) a topic identifier. By way of example, the topic identifier comprises a string representing the topic of the message.

The proxy then intercepts the communicated message and topic identifier and alters it in step 135. In this example, the proxy receives the message and topic identifier from the publisher device and alters the topic identifier to create a modified topic identifier comprising a description of the topic of the message, and the set of publisher devices that the publisher device belongs to. As a result, the broker generates a modified topic identifier.

The modified topic identifier is then transmitted from the proxy to the broker in step 140, and the broker subsequently receives the modified subscription identifier in step 145.

Next, in step 150, the broker analyzes the modified topic identifier against the modified subscription identifiers it has received from subscriber applications (via the proxy) to determine if the published message is to be communicated to one or more subscriber applications. By way of example, the broker compares the modified topic identifier (received in step 145) with previously received modified subscription identifier (as in step 125 for example). Thus, the broker determines whether the message from the publisher device is to be communicated to a subscriber application and, if so, to which subscriber application.

Based on the result of the determination in step 150, the broker transmits the message towards the appropriate target/intended subscriber application in step 155. Of course, if as a result of the determination step 150, the broker determines that no subscriber application should be sent the message (e.g. because no match between subscription topic and message topic is identified), the broker would not transmit any message. However, for the purpose of this example, it is assumed that the broker determines that the message should be communicated to the subscriber application and thus transmits the message (along with its modified topic identifier) in step 155.

The proxy then intercepts the transmitted message and modified topic identifier and alters it in step 160. In this example, the proxy receives the message and modified topic identifier from the broker and alters the modified topic identifier. More specifically, the proxy removes the description of the set of devices that the publisher device belongs to from the modified topic identifier, thereby forming a reverted topic identifier (which is identical to the original topic identifier of the message published by the publisher device).

The proxy then communicates the published message with the reverted topic identifier to the subscriber application and it is received by the subscriber application in step 165.

Figure 4:
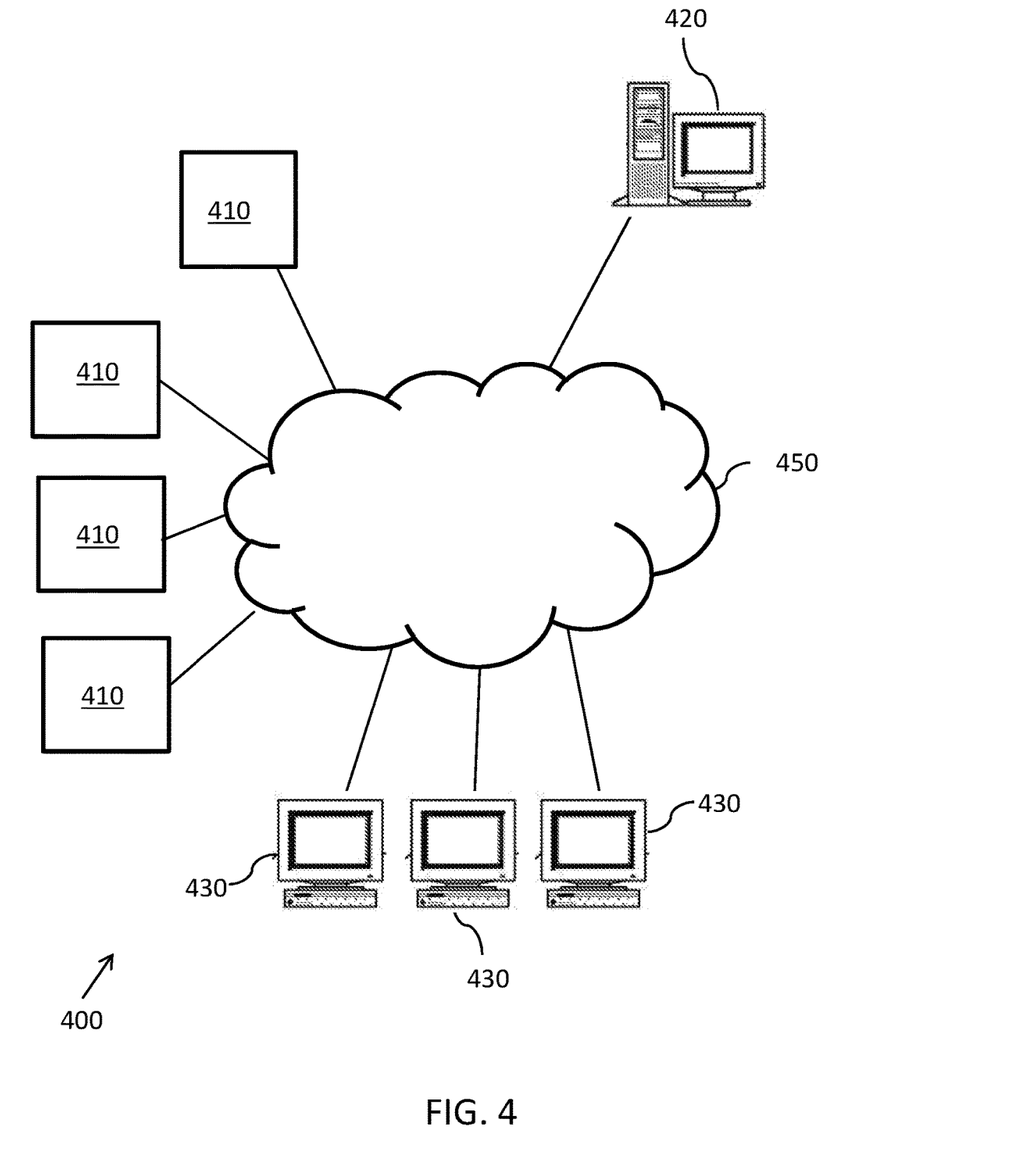
FIG. 4 is a schematic block diagram of a system, in accordance with one or more aspects of the present invention.

FIG. 4 is a schematic block diagram of a messaging system 400 according to an embodiment of the present subject matter. The messaging system 400 comprises publisher devices 410, a message server 420 (adapted to implement a proxy application and a broker application), and a plurality of subscriber terminals 430 (adapted to implement subscriber applications). The publishers 410, message broker server 420, and subscriber terminals 430 are all connected to a communication network 450 (such as the Internet for example).

The subscribers create subscriptions to selected publication topics and register the subscriptions with the message broker server 420. Permissions information (relating to the what publisher devices 410 the subscribers are authorized to receive messages/publications from) are also provided to the message broker server 420, for example by the subscribers, an input interface to the message broker server, and/or terminals connected to the communication network (such as the publishers 410 for example).

The proxy application of the message broker server 420 is adapted to

The message broker server 420 is adapted to generate modified topic identifiers and modified subscriber identifier which may then be used (e.g. processed or analysed by a broker application) to control the delivery of published messages to the subscriber application(s). Prior to delivery to a subscriber terminal 430, the modified topic identifier may be reverted back to its original form.

The proxy application may, for example, intercept messages from a publisher device 410 and undertake modification of the topic identifier before communicating the modified topic identifier to the broker application of the message broker server 420. Similarly, the proxy application may intercept subscriptions from the subscriber applications and undertake modification of the subscription identifiers before communicating the modified subscription identifiers to the broker application of the message broker server 420. The proxy application may also then intercept messages from the broker application of the message broker server 420 and revert the modified topic identifiers back to their original form before communicating the message to the intended/target subscriber terminal(s) 430 via the communication network 450.

It will be appreciated that the messaging system 400 enables a selective publication concept for enabling flexible subscriptions such that different subscriber applications can use different topic strings to subscribe to the messages from sets of devices. The proposed concepts may be employed in existing messaging system comprising sets of publisher devices, a broker (e.g. broker application) and a subscriber application.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

It will be equally clear to one of skill in the art that all or part of a logic arrangement according to one embodiment of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of controlling message delivery from publisher devices to a subscriber application of a messaging system, the subscriber application having a subscription registered with a message broker of the messaging system and only being permitted to receive messages relating to a topic of the subscription from a predetermined set of one or more publisher devices, the method comprising:

receiving a message from a publisher device and, based on receiving the message, altering a topic identifier of the message to a modified topic identifier comprising a description of the topic of the message and a set of one or more publisher devices that the publisher device belongs to, and providing the message with the modified topic identifier to the message broker;

receiving a subscription identifier from a subscriber application and, based on receiving the subscription identifier, altering the subscription identifier to a modified subscription identifier comprising a description of the topic of the subscription and a predetermined set of one or more publisher devices from which the subscriber application is permitted to receive messages, and providing the modified subscription identifier to the message broker, wherein a proxy application, adapted to intercept messages and subscription identifiers being communicated to or from the message broker, performs the receiving the message, altering the topic identifier, providing the message and the modified topic identifier to the message broker, receiving the subscription identifier, altering the subscription identifier, and providing the modified subscription identifier to the message broker;

analyzing the modified topic identifier and the modified subscription identifier, and determining whether the message is to be communicated to the subscriber application, wherein the message broker performs the analyzing the modified topic identifier and the modified subscription identifier, and the determining whether the message is to be communicated to the subscriber application; and if the message is to be communicated to the subscriber application, removing from the modified topic identifier the description of the set of one or more publisher devices that the publisher device belongs to, wherein the removing forms a reverted topic identifier of the message, and sending the message and reverted topic identifier to the subscriber application.

2. The computer-implemented method of claim 1, wherein the removing the description of the set of one or more publisher devices that the publisher device belongs to from the modified topic identifier is undertaken such that the reverted topic identifier is identical to the topic identifier of the message from the publisher device.

3. The computer-implemented method of claim 1, wherein the description of the topic of the subscription comprises a string supporting wildcard entries, and wherein the description of the topic of the message comprises a string.

4. The computer-implemented method of claim 3, wherein the message broker is a Message Queuing Telemetry Transport, MQTT, broker application.

5. The computer-implemented method of claim 1, further comprising:

obtaining a data structure describing a plurality of different sets of one more publisher devices; and
wherein the altering the topic identifier comprises analyzing the obtained data structure to identify the set of one or more publisher devices that the publisher device belongs to.

6. The computer-implemented method of claim 5, wherein the altering the subscription identifier comprises analyzing the obtained data structure to identify the set of one or more publisher devices that a message is permitted to be received from.

7. A computer program product for controlling message delivery from publisher devices to a subscriber application of a messaging system, the subscriber application having a subscription registered with a message broker of the messaging system and only being permitted to receive messages relating to a topic of the subscription from a predetermined set of one or more publisher devices, the computer program product comprising:

a non-transitory computer readable storage medium having program instructions embodied therewith, the program instructions executable by a processing unit to cause the processing unit to perform a method comprising:

receiving a message from a publisher device and, based on receiving the message, altering a topic identifier of the message to a modified topic identifier comprising a description of the topic of the message and a set of one or more publisher devices that the publisher device belongs to, and providing the message with the modified topic identifier to the message broker;

receiving a subscription identifier from a subscriber application and, based on receiving the subscription identifier, altering the subscription identifier to a modified subscription identifier comprising a description of the topic of the subscription and a predetermined set of one or more publisher devices from which the subscriber application is permitted to receive messages, and providing the modified subscription identifier to the message broker, wherein a proxy application, adapted to intercept messages and subscription identifiers being communicated to or from the message broker, performs the receiving the message, altering the topic identifier, providing the message and the modified topic identifier to the message broker, receiving the subscription identifier, altering the subscription identifier, and providing the modified subscription identifier to the message broker;

analyzing the modified topic identifier and the modified subscription identifier, and determining whether the message is to be communicated to the subscriber application, wherein the message broker performs the analyzing the modified topic identifier and the modified subscription identifier, and the determining whether the message is to be communicated to the subscriber application; and if the message is to be communicated to the subscriber application, removing from the modified topic identifier the description of the set of one or more publisher devices that the publisher device belongs to, wherein the removing forms a reverted topic identifier of the message, and sending the message and reverted topic identifier to the subscriber application.

8. The computer program product of claim 7, wherein the removing the description of the set of one or more publisher devices that the publisher device belongs to from the modified topic identifier is undertaken such that the reverted topic identifier is identical to the topic identifier of the message from the publisher device.

9. The computer program product of claim 7, wherein the description of the topic of the subscription comprises a string supporting wildcard entries, and wherein the description of the topic of the message comprises a string.

10. The computer program product of claim 9, wherein the message broker is a Message Queuing Telemetry Transport, MQTT, broker application.

11. The computer program product of claim 7, further comprising:
obtaining a data structure describing a plurality of different sets of one more publisher devices; and
wherein the altering the topic identifier comprises analyzing the obtained data structure to identify the set of one or more publisher devices that the publisher device belongs to.

12. The computer program product of claim 11, wherein the altering the subscription identifier comprises analyzing the obtained data structure to identify the set of one or more publisher devices that a message is permitted to be received from.

13. A system for controlling message delivery from publisher devices to a subscriber application of a messaging system, the subscriber application having a subscription registered with a message broker of the messaging system and only being permitted to receive messages relating to a topic of the subscription from a predetermined set of one or more publisher devices, the system comprising:
a memory; and
a processor communicatively coupled to the memory, wherein the system performs a method comprising:
receiving a message from a publisher device and, based on receiving the message, altering a topic identifier of the message to a modified topic identifier comprising a description of the topic of the message and a set of one or more publisher devices that the publisher device belongs to, and providing the message with the modified topic identifier to the message broker;

receiving a subscription identifier from a subscriber application and, based on receiving the subscription identifier, altering the subscription identifier to a modified subscription identifier comprising a description of the topic of the subscription and a predetermined set of one or more publisher devices from which the subscriber application is permitted to receive messages, and providing the modified subscription identifier to the message broker, wherein a proxy application, adapted to intercept messages and subscription identifiers being communicated to or from the message broker, performs the receiving the message, altering the topic identifier, providing the message and the modified topic identifier to the message broker, receiving the subscription identifier, altering the subscription identifier, and providing the modified subscription identifier to the message broker;

analyzing the modified topic identifier and the modified subscription identifier, and determining whether the message is to be communicated to the subscriber application, wherein the message broker performs the analyzing the modified topic identifier and the modified subscription identifier, and the determining whether the message is to be communicated to the subscriber application; and if the message is to be communicated to the subscriber application, removing from the modified topic identifier the description of the set of one or more publisher devices that the publisher device belongs to, wherein the removing forms a reverted topic identifier of the message, and sending the message and reverted topic identifier to the subscriber application.

14. The system of claim 13, wherein the removing the description of the set of one or more publisher devices that the publisher device belongs to from the modified topic identifier is undertaken such that the reverted topic identifier is identical to the topic identifier of the message from the publisher device.

* * * * *